(12) United States Patent
Cho (10) Patent No.: US 11,808,340 B2
(45) Date of Patent: Nov. 7, 2023

(54) IDLE GEAR SET FOR OVERHEAD POULTRY CONVEYOR (71) Applicant: Jong Il Cho, Gyeonggi-do (KR)

(72) Inventor: Jong-Won Cho, Gyeonggi-do (KR)

(73) Assignee: Jong Il Cho, Gyeonggi-do (KR)

(*) Notice: Subject to any disclaimer, the term of this patent is extended or adjusted under 35 U.S.C. 154(b) by 485 days.

(21) Appl. No.: 17/261,297

(22) PCT Filed: Jun. 19, 2019

(86) PCT No.: PCT/KR2019/007408
§ 371 (c)(1),
(2) Date: Jan. 19, 2021

(87) PCT Pub. No.: WO2020/022649
PCT Pub. Date: Jan. 30, 2020

(65) Prior Publication Data
US 2021/0262561 A1 Aug. 26, 2021

(30) Foreign Application Priority Data

Jul. 27, 2018 (KR) .................. 10-2018-0087521

(51) Int. Cl.
F16H 55/30 (2006.01)
B65G 17/20 (2006.01)
(Continued)

(52) U.S. Cl.
CPC ........ *F16H 55/303* (2013.01); *A22C 21/0053* (2013.01); *B65G 17/20* (2013.01); *B65G 17/30* (2013.01)

(58) Field of Classification Search
CPC ........ F16H 55/303; B65G 17/30; B65G 17/20; A22C 21/0053
(Continued)

(56) References Cited

U.S. PATENT DOCUMENTS 5,318,483 A 6/1994 Reid et al.
9,146,150 B2 9/2015 van den Berg et al.

FOREIGN PATENT DOCUMENTS

CN 201357881 Y 12/2009
CN 201436424 U 4/2010
(Continued)

OTHER PUBLICATIONS

Chinese Office Action dated Sep. 7, 2021, received for corresponding Chinese Application No. 201980048112.5, eight pages.
(Continued)

*Primary Examiner* — Gene O Crawford
*Assistant Examiner* — Emily R Kincaid
(74) *Attorney, Agent, or Firm* — Kinney & Lange, P.A.

(57) ABSTRACT

The present invention relates to an idle gear set for an overhead poultry conveyor, the gear set including a variable structure chain gear capable of being adjusted in size according to the needs of a user. Specifically, an idle gear set for an overhead poultry conveyor includes a chain gear for moving a roller assembly, the chain gear comprises: a pair of plates vertically spaced apart and arranged in parallel; and a plurality of chain guides interposed between the pair of plates, and radially arranged along the circumferences of the plates, wherein the chain guides are arranged to be spaced apart such that a mounting groove into which the roller assembly is inserted can be formed between the chain guide and another adjacent chain guide.

8 Claims, 9 Drawing Sheets (51) Int. Cl.
*B65G 17/30* (2006.01)
*A22C 21/00* (2006.01)

(58) Field of Classification Search
USPC .......................................................... 474/152
See application file for complete search history.

(56) References Cited

FOREIGN PATENT DOCUMENTS

| | | |
|---|---|---|
| CN | 204110197 U | 1/2015 |
| CN | 204300296 U | 4/2015 |
| CN | 204300298 U | 4/2015 |
| CN | 204300299 U | 4/2015 |
| CN | 106090155 A | 11/2016 |
| CN | 205745188 U | 11/2016 |
| GB | 2481847 A | 1/2012 |
| KR | 20130088733 A | 8/2013 |
| KR | 20150002813 A | 1/2015 |
| KR | 20160086856 A | 7/2016 |
| KR | 20170060137 A | 5/2017 |

OTHER PUBLICATIONS

Hanjun Huang, Disassembly and Assembly of Mechanical System vol. II, Shanghai Science and Technology Press, Jan. 2009, pp. 111-113.

International Search Report and Written Opinion dated Oct. 18, 2019, for corresponding PCT Application No. PCT/KR2019/007408.

IDLE GEAR SET FOR OVERHEAD POULTRY CONVEYOR

CROSS-REFERENCE TO RELATED APPLICATION(S)

This application is the national phase of PCT Application No. PCT/KR2019/007408 filed on Jun. 19, 2019, which claims priority to Korean Application No. 10-2018-0087521 filed on Jul. 27, 2018, both of which are incorporated by reference herein in their entireties.

BACKGROUND

Technical Field

Disclosed herein is an idle gear set for an overhead poultry conveyor, and, more particularly, an idle gear set that is installed in an overhead conveyor for transporting poultry and used to change a transportation direction.

Background Art

In general, slaughtering is a process of removing feathers from chickens and eviscerating the raw chickens to manufacture whole chickens. After the slaughtering process, the whole chickens are cut into pieces and manufactured as raw meat or are additionally processed and manufactured as processed meat.

The slaughtering process includes hanging raw chickens on a conveyor and placing the raw chickens into a processing line, stunning the raw chickens in the processing line with electric current, bleeding out the stunned chickens, scalding the stunned chickens, removing feathers from the chickens and eviscerating the chickens.

A conveyor that transports raw chickens or whole chickens in the slaughtering process is an overhead conveyor that moves along a rail track installed on the ceiling.

An ordinary overhead conveyor includes a rail track installed along a preset path on the ceiling of a work place, a roller assembly configured to transport raw chickens or whole chickens while moving along the rail track, and an idle gear set configured to generate a rotational force for movement of the roller assembly or change a direction of movement of the roller assembly.

An idle gear set installed in an overhead conveyor is disclosed in Korean Patent Publication No. 2016-0086856 (published on Jul. 20, 2016).

The gear set of the related art includes a main shaft connected to a driving means, and a chain gear (a sprocket) coupled to the main shaft. The idle gear set is linked with the roller assembly through a concave groove formed on an outer circumference of the chain gear such that the roller assembly rotates around the main shaft.

Among the above-described components, the chain gear has an integrated structure where the concave groove is formed along the outer circumference. Thus, the chain gear can be used only up to a standard at the time of manufacturing.

SUMMARY

The present disclosure is directed to an idle gear set for an overhead poultry conveyor that may include a chain gear the size of which is adjustable according to the needs of a user and which has a variable structure.

An idle gear set for an overhead poultry conveyor according to the present disclosure may include a chain gear configured to move a roller assembly.

The chain gear may include a pair of plates spaced apart in an up-down direction and arranged in parallel, and a plurality of chain guides interposed between the pair of plates and arranged radially along a circumference of the plate. In this case, the chain guides may be spaced apart such that a mounting groove, into which the roller assembly is inserted, is formed between a chain guide and another adjacent chain guide.

The chain guide may include a body inserted between the pair of plates, and an edge protruding to an outside of the plate. In this case, a jaw may be formed between the body and the edge, and the plate may be settled onto the jaw.

The edge may include a settling groove, into which a chain is inserted, on an outer circumferential surface thereof.

The plate may include a groove at a position corresponding to the mounting groove.

With the above-described structure according to the present disclosure, a variable structure, where a plurality of chain guides are interposed between a pair of plates, may be provided, thereby making it possible to adjust a size of a chain gear according to the needs of a user. That is, when a diameter of the plate and the number of the chain guides included in the chain gear vary, the size of the chain gear may be adjusted.

For example, when a large-scale idle gear is needed considering conditions in a work place or arrangement of equipment, a plate having a large diameter and a large number of chain guides may be used to manufacture a chain gear. When a small-scale idle gear is needed, a plate having a relatively small diameter and a small number of chain guides may be used to manufacture a chain gear.

Thus, the size of the chain gear may be adjusted according to the needs of a user considering conditions in work places where the overhead conveyer is installed or arrangement of equipment and the like. Accordingly, the gear set may be used widely.

DETAILED DESCRIPTION

Embodiments in the present disclosure are described with reference to the accompanying drawings. In description of the embodiments, like components in each drawing may be given like reference numerals although they are illustrated in different drawings.

The present disclosure relates to an idle gear set that may be installed in an overhead conveyor for transporting poultry and may be used to change a direction of movement of a roller assembly from which poultry is suspended.

A structure of an idle gear set for an overhead poultry conveyor according to one embodiment is described with reference to FIGS. 1 to 4.

The idle gear set for an overhead poultry conveyor 10 (hereinafter, "gear set") according to the embodiment may include a shaft 100, a housing 200 coupled to an end of the shaft 100, a bearing 300 interposed between the shaft 100 and the housing 200, and a chain gear 400 coupled to the housing 200.

Figure 1:
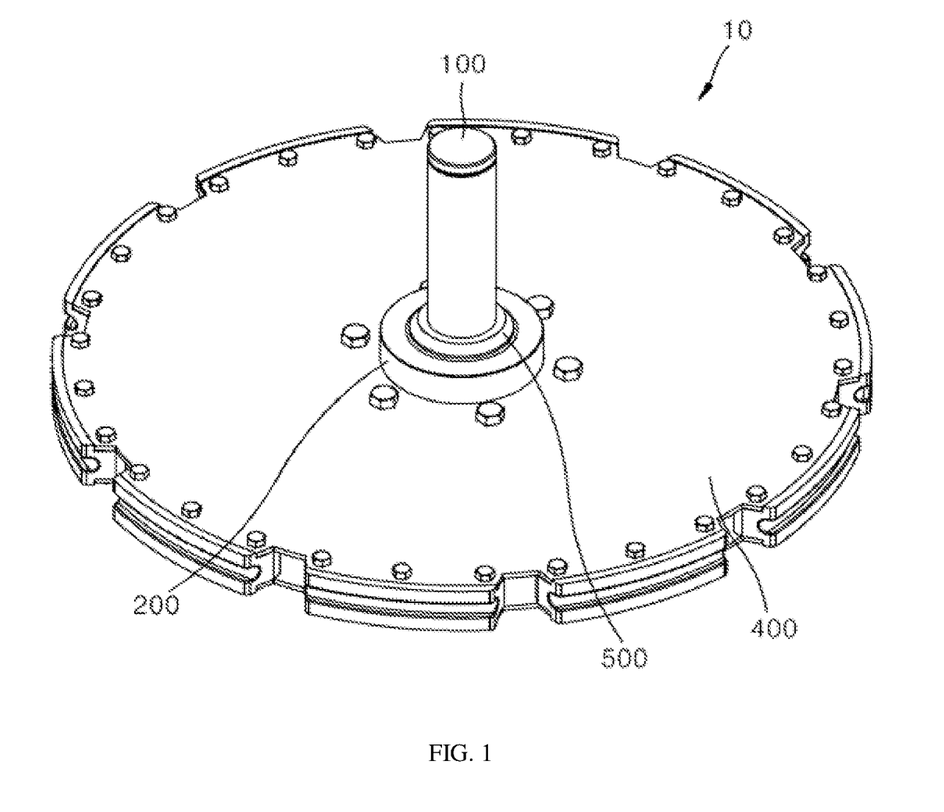
FIG. 1 is a perspective view showing an idle gear set for an overhead poultry conveyor according to one embodiment.
Figure 2:
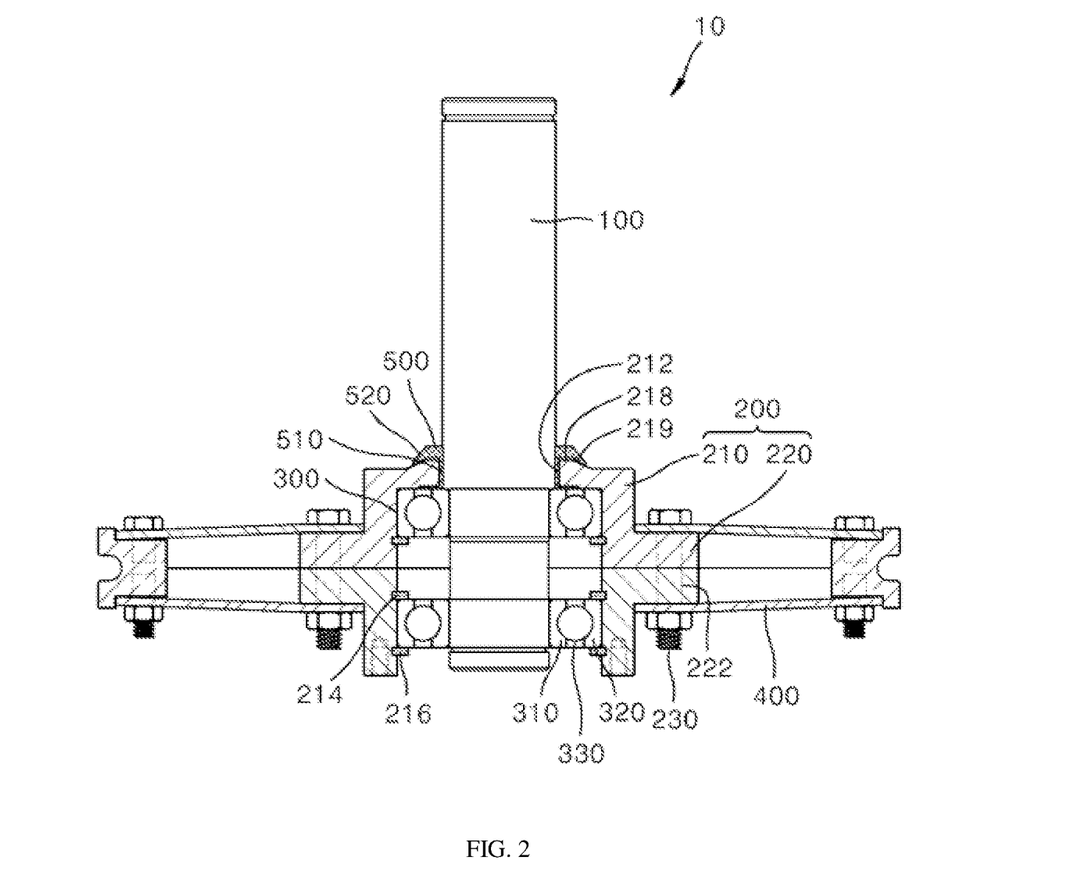
FIG. 2 is a cross-sectional view showing an idle gear set for an overhead poultry conveyor according to one embodiment.

The shaft 100 may be installed in a driver of the overhead conveyor to deliver a rotational force to the chain gear 400, or may be installed in a direction changing part of the overhead conveyor and may idle to change a direction.

The shaft 100 according to the embodiment may be installed at an edge and the like of the overhead conveyor in a way that the shaft 100 may idle at the direction changing part.

The shaft 100 may have a multi-stage cylindrical shape that extends in one direction. That is, for the shaft 100, a diameter of a lower end, where the housing 200 and the bearing 300 are installed, may be less than that of a middle end and an upper end.

The housing 200 may include a body 210 to which the shaft 100 is coupled, and a flange 220 to which the chain gear 400 is coupled.

The body 210 may have a cylindrical shape that extends in one direction. Specifically, the body 210 may have the shape of a cylinder, a top surface of which is closed and a bottom surface of which is open. The body 210 may have a penetration hole 212 for installing the shaft 100 at a center of the closed top surface.

An inside of the body 210 may be formed into a hollow hole through which the shaft 100 passes, to which the shaft 100 is coupled, and in which the bearing 300 supporting the shaft 100 coupled to the body 210 is installed. In this case, a snap ring groove 214 may be formed on an inner wall of the body 210, and a snap ring 216 configured to fix the bearing 300 may be installed in the snap ring groove 214.

A contacting part 218 may protrude from the top surface of the body 210, i.e., a circumference of the penetration hole 230. The contacting part 218 may be a part that is contacted by a sealing lip 520 of a below-described sealing member 500. The contacting part 218 may include an inclined surface 219 to improve adhesion between the contacting part 218 and the sealing lip 520.

The sealing member 500 may be installed between the shaft 100 and the housing 200 and may prevent a foreign substance such as moisture and the like from coming into the housing 200. The sealing member 500 may include a mounting part 510 interposed between the shaft 100 and the housing 200, and a sealing lip 520 in close contact with the inclined surface 219 of the contacting part 218. The sealing lip 520 may further incline than the inclined surface 219 and may completely prevent a foreign substance from coming from between the contacting part 218 and the sealing lip 520.

The flange 220 may be formed along an outer circumferential surface of a middle end of the body 210 and may have a circular plate shape protruding outward and having a predetermined thickness. The flange 220 may have a coupling hole 222 to which a bolt 230 for a coupling with the chain gear 400 is coupled.

The bearing 300 may be an ordinary ball bearing including an inner wheel 310, an outer wheel 320 and a ball 330. A pair of bearings 300 may be provided and spaced apart in an up-down direction to stably support the shaft 100 coupled to the housing 200.

The pair of bearings 300, as described above, may be fixed to the housing 200 through the snap ring 216 installed in the snap ring groove 214 formed on the inner wall of the body 210.

The chain gear 400 may be installed at the shaft 100 in a way that the chain gear 400 idles and may change a direction of movement of the roller assembly 20 from which poultry is suspended.

Figure 3:
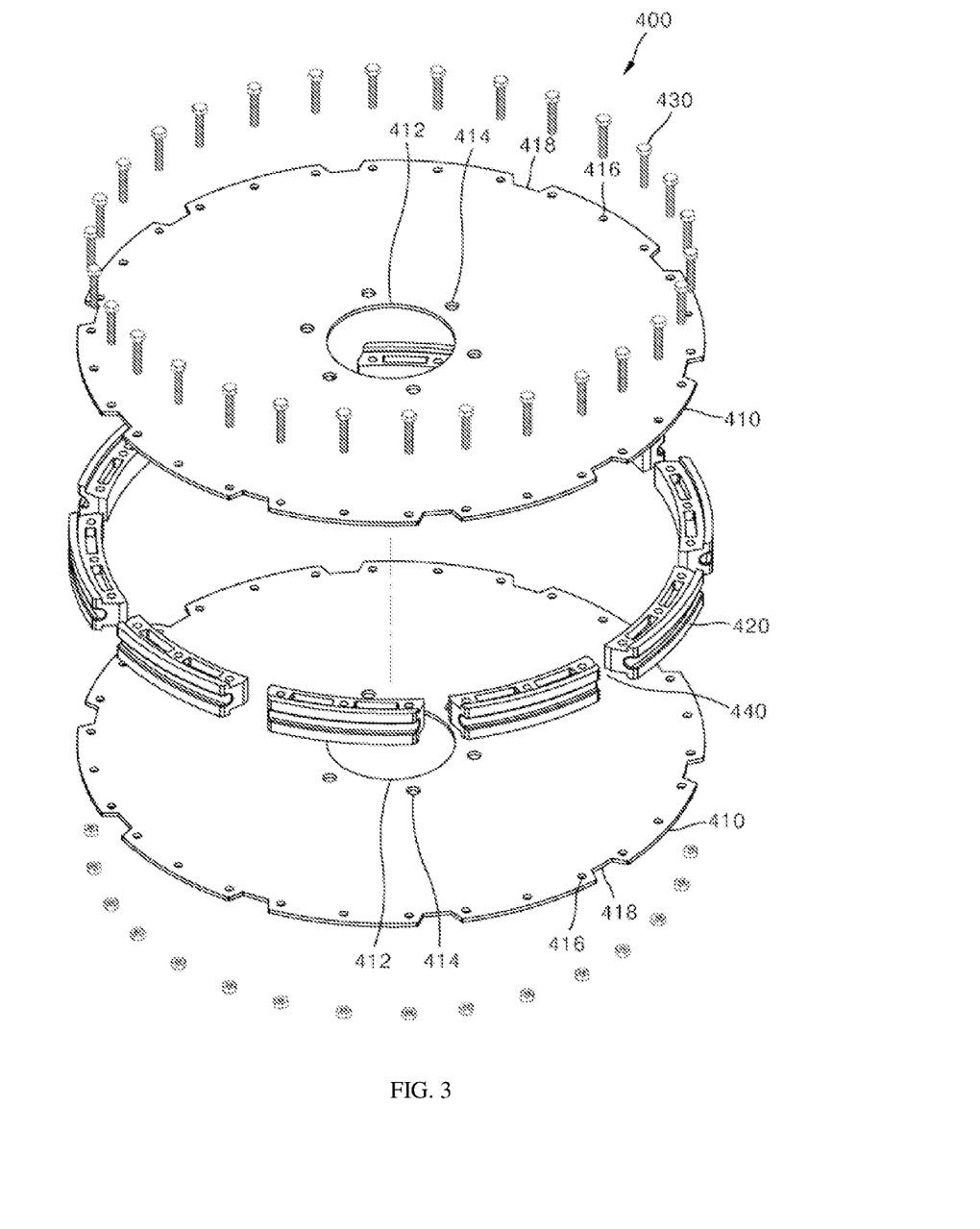
FIG. 3 is an exploded perspective view showing a chain gear of an idle gear set for an overhead poultry conveyor according to one embodiment.

The chain gear 400 may include a pair of plates 410 spaced apart in the up-down direction and arranged in parallel, and a plurality of chain guides 420 interposed between the pair of plates 410 and arranged radially along a circumference of the plate 410.

The plate 410 may be a metallic plate that is thin and has a circular shape. The plate 410 may have a penetration hole 412 through which the shaft 100 passes, at a center thereof. A first coupling hole 414, to which a bolt 230 for a coupling with the flange 220 is coupled, may be formed around the penetration hole 412. A second coupling hole 416, to which a bolt 430 for a coupling with the chain guide 420 is coupled, may be formed around the plate 410.

The plate 410 may have a plurality of grooves 418 that are formed radially along an outer circumference of the plate 410. The groove 418 may be a part into which the roller assembly 20, from which poultry is suspended, is inserted, and may guide movement of the roller assembly 20 installed along a chain 30.

Figure 4:
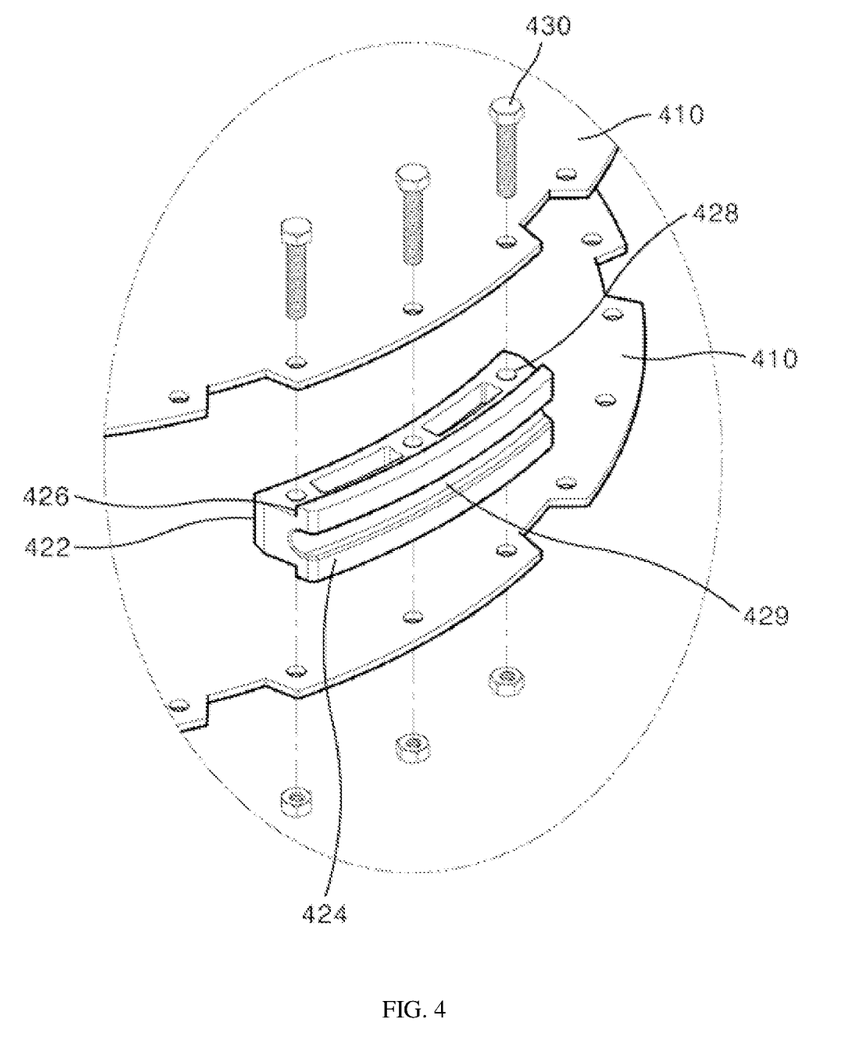
FIG. 4 is an enlarged view showing a portion of FIG. 3.

The chain guide 420 may be interposed between the pair of plates 410, and arranged radially along the circumference of the plate 410. The chain guide 420 may be made of a material having elasticity.

The chain guides 420 may be spaced at regular intervals such that a mounting groove 440, into which the roller assembly 20 is inserted, is formed between a chain guide and another adjacent chain guide 420. In this case, the groove 418 of the plate 410 may be positioned to correspond to the mounting groove 440 between the chain guides 420.

The chain guide 420 may include a body 422 inserted between the pair of plates 410, and an edge 424 formed at an outer circumference of the body 422 and protruding to an outside of the plate 410.

The body 422 of the chain guide 420 may have a thickness less than that of the edge 424, and include a jaw 426 between the body 422 and the edge 424. The plate 410 may be settled onto the jaw 426.

When the jaw 426 is formed between the body 422 and the edge 424 as described above, a load applied to a center of the chain gear 400 may be stably supported at a time of rotation of the chain gear 400, thereby preventing the chain guide 420 from being separated, damaged or deformed.

The body 422 may include a third coupling hole 428 to which a bolt 430 for a coupling with the plate 410. That is, when the plate 410 and the chain guide 420 are coupled, the bolt 430 may be coupled through the second coupling hole 416 and the third coupling hole 428.

The edge 424 may include a settling groove 429 into which a chain 30 is inserted, on an outer circumferential surface thereof. The settling groove 429 may guide the chain 30 and, at the same time, may prevent the chain 30 wound around the chain gear 400 from escaping or separating.

The chain gear 400 having the above-described structure may be assembled in different sizes according to the needs of a user.

Figure 5:
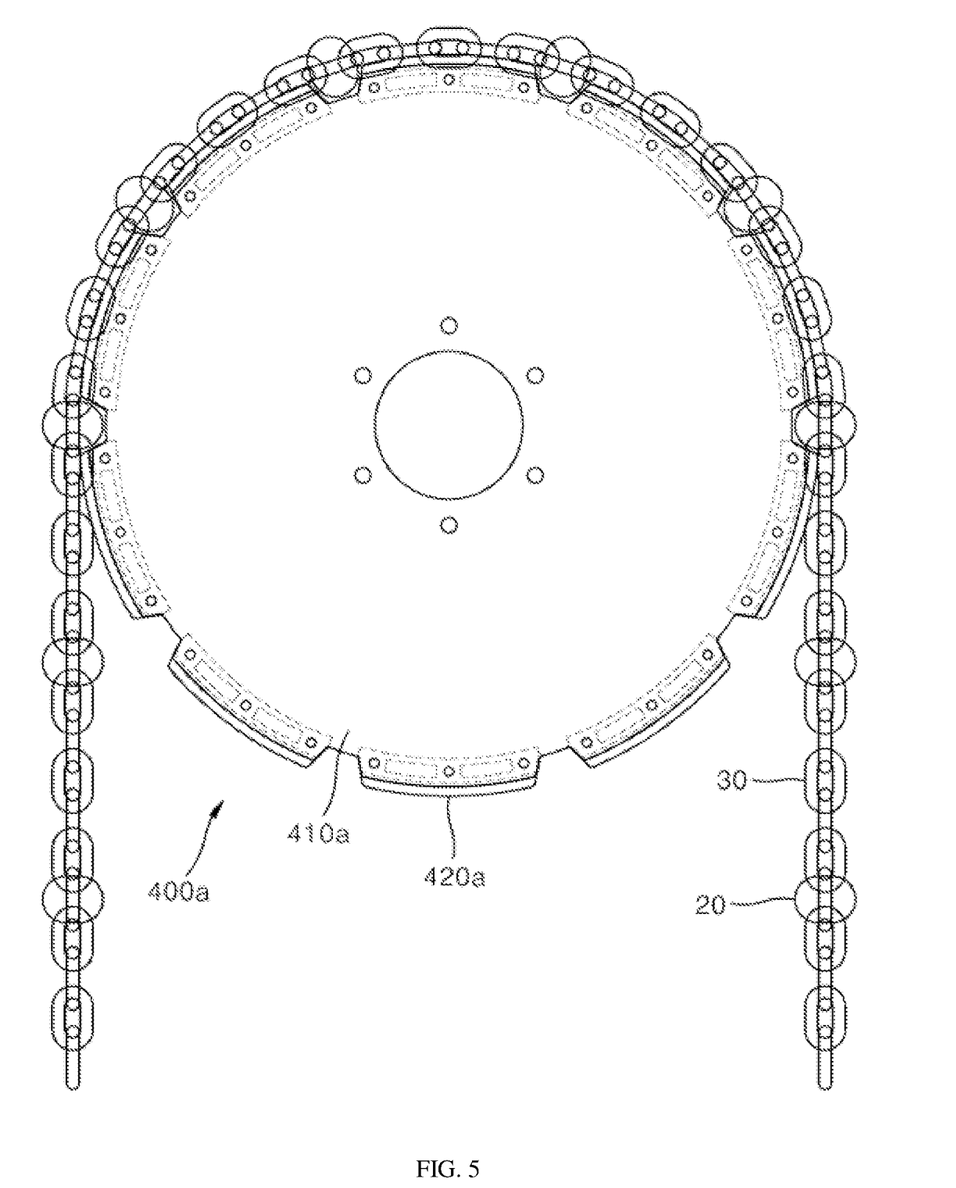
FIGS. 5 and 6 are views showing a state of a chain gear of an idle gear set for an overhead poultry conveyor according to one embodiment, when in use.
Figure 6:
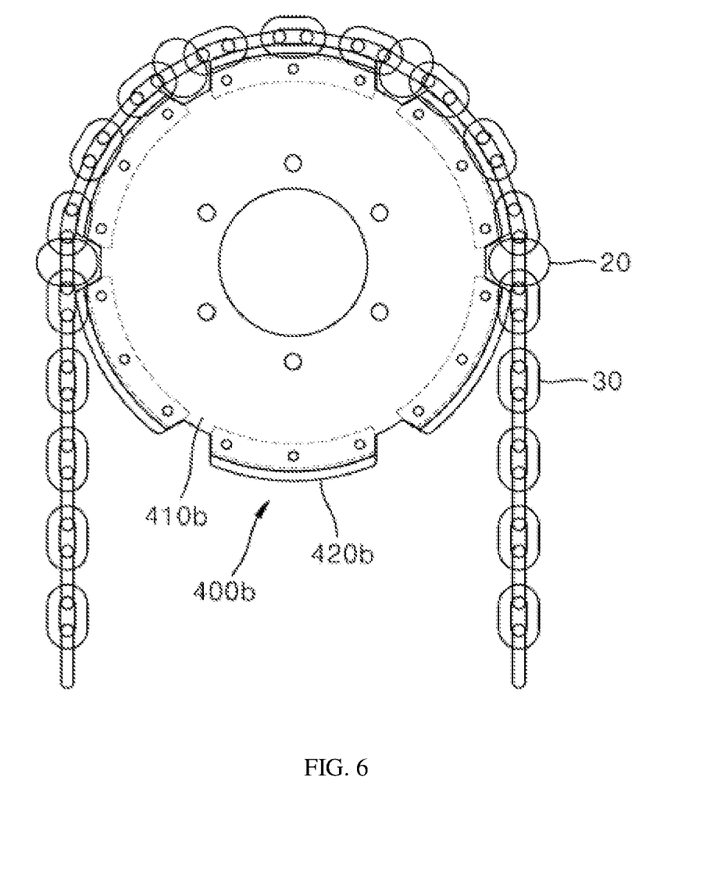

For example, when a large-scale idle gear is needed to meet the needs in work places or in terms of arrangement of equipment, a relatively large chain gear (400a in FIG. 5) may be required. When a small-scale idle gear is needed, a relatively small chain gear (400b in FIG. 6) may be required.

When a large-scale idle gear is needed, a relatively large chain gear (400a in FIG. 5) including a plate 410a having a relatively large diameter and a large number of chain guides 420a may be provided. When a small-scale idle gear is needed, a relatively small chain gear (400b in FIG. 5) including a plate 410b having a relatively small diameter and a small number of chain guides 420b may be provided.

That is, considering a size of a work place where an overhead conveyor is installed, and the like, a diameter of the plate 410 and the number of the chain gears 400 may vary to adjust a size of the chain gear 400 according to the needs of a user.

The size of the gear set 10 according to the embodiment may differ according to the needs of a user considering the conditions in work places or the arrangement of equipment and the like. Accordingly, the gear set 10 may be used widely.

Figure 7:
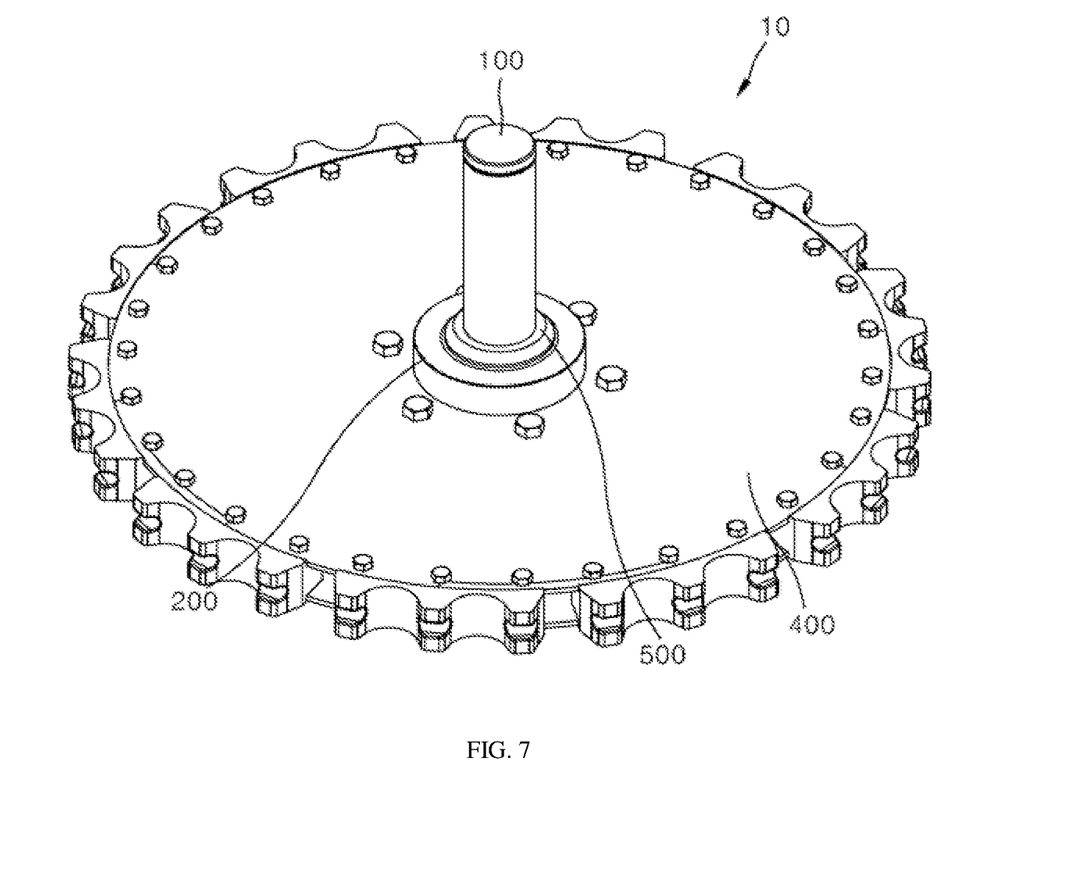
FIG. 7 is a perspective view showing an idle gear set for an overhead poultry conveyor according to another embodiment.
Figure 8:
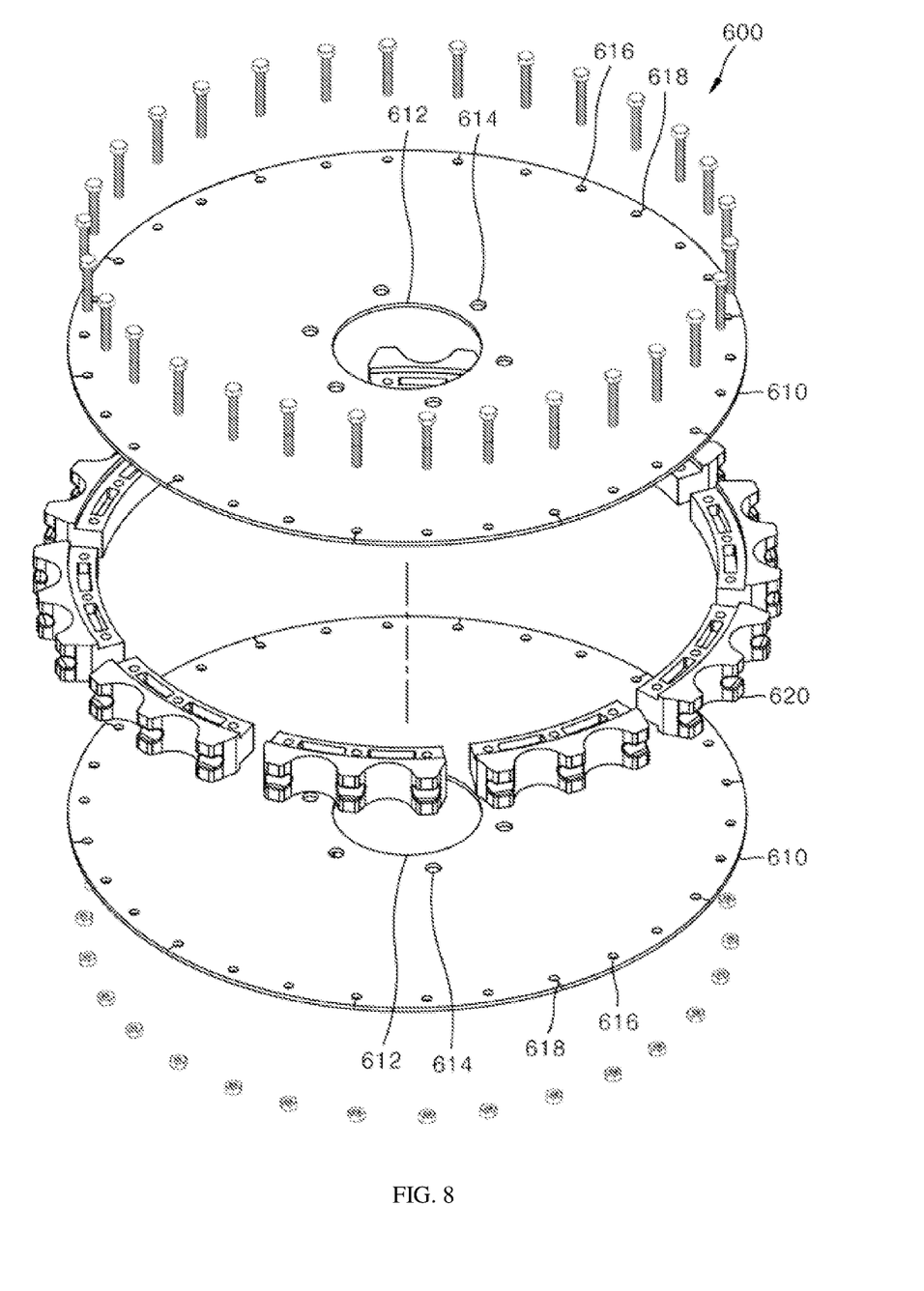
FIG. 8 is an exploded perspective view showing a chain gear of an idle gear set for an overhead poultry conveyor according to another embodiment.
Figure 9:
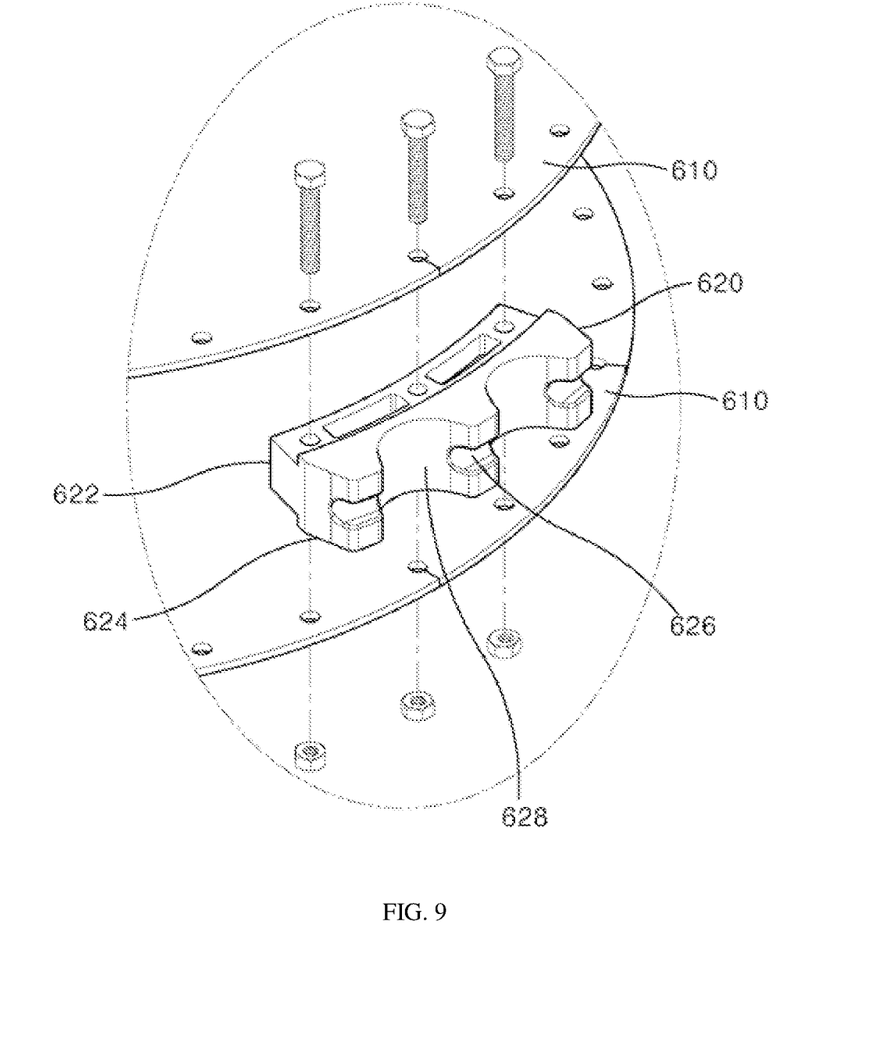
FIG. 9 is an enlarged view showing a portion of FIG. 8.

FIG. 7 to FIG. 9 show an idle gear set for an overhead poultry conveyor according to another embodiment.

A gear set 10 according to the embodiment may include a shaft 100, a housing 200 coupled to an end of the shaft 100, a bearing (not illustrated) interposed between the shaft 100 and the housing 200, a chain gear 600 coupled to the housing 200, and a sealing member 500 configured to seal between the shaft 100 and the housing 200.

The gear set 10 according to the embodiment is the same as the gear set according to one embodiment except for a shape of a chain gear 600, which is different from the shape of the chain gear 400 according to one embodiment. Description of the same component is omitted.

The chain gear 600 may include a pair of plates 610 spaced apart in an up-down direction and arranged in parallel, and a plurality of chain guides 620 interposed between the pair of plates 610 and arranged radially along a circumference of the plate 610.

The plate 610 may be a metallic plate that is thin and has a circular shape. The plate 610 may have a penetration hole 612 through which a shaft 100 passes, at a center thereof. A first coupling hole 614, to which a bolt 230 for a coupling with the housing 200 is coupled, may be formed around the penetration hole 612. A second coupling hole 616, to which a bolt 630 for a coupling with the chain gear 600 is coupled, may be formed on an outer circumference of the plate 610.

Unlike the plate 410 according to one embodiment, the plate 610 according to the embodiment may not include a groove (418 in FIG. 3), and a plurality of cuts 618 may be formed radially along the outer circumference of the plate 610.

While the chain guide 620 is interposed between the pair of plates 610, and arranged radially along the circumference of the plate 610, the chain guides 620 may be spaced apart such that a mounting groove 640, into which a roller assembly 20 is inserted, is formed between a chain guide and another adjacent chain guide.

The chain guide 620 may include a body 622 inserted between the pair of plates 610, and an edge 624 formed at an outer circumference of the body 622 and protruding to an outside of the plate 610.

On an outer circumferential surface of the edge 624, a first settling groove 626 into which the chain 30 is inserted, and a second settling groove 628 into which the roller assembly 20 is inserted. The first settling groove 626 may guide the chain 30 and, at the same time, may prevent the chain 30 wound around the chain gear 600 from escaping or separating. The second settling groove 628 may allow the roller assembly 20 to move stably when the roller assembly 20 is installed along the chain 30 at narrow intervals.

The embodiments are described above with reference to a number of illustrative embodiments thereof. However, it can be understood by one skilled in the art that the embodiments are provided only as examples of the technical ideas of the disclosure and that numerous other modifications and embodiments are devised without departing from the technical spirit of the disclosure. Thus, the scope of protection should be defined based on descriptions in the claim section other than a specific embodiment, and all the technical ideas in a scope corresponding to the claims should be interpreted as being included in the scope of the right to the disclosure.

The invention claimed is:

1. An idle gear set for an overhead poultry conveyor including a chain gear configured to move a roller assembly, the chain gear comprising:
    a pair of plates spaced apart in an up-down direction and arranged in parallel; and
    a plurality of chain guides interposed between the pair of plates and arranged radially along a circumference of the plates,
    wherein the chain guides are spaced apart such that a mounting groove, into which the roller assembly is inserted, is formed between a chain guide and another adjacent chain guide.

2. The idle gear set for an overhead poultry conveyor of claim 1, wherein the chain guides each comprise a body inserted between the pair of plates, and an edge protruding to an outside of a respective plate, and
    a jaw is formed between the body and the edge, and the respective plate is settled onto the jaw.

3. The idle gear set for an overhead poultry conveyor of claim 2, wherein the edge includes a settling groove, into which a chain is inserted, on an outer circumferential surface thereof.

4. The idle gear set for an overhead poultry conveyor of claim 3, wherein the plates include a groove at a position corresponding to the mounting groove.

5. The idle gear set for an overhead poultry conveyor of claim 1, comprising:
    a housing protruding from an upper portion and a lower portion of the chain gear, while being installed at a center of the chain gear and interposed between the pair of plates;
    a bearing installed in the housing;
    a shaft configured to pass through the housing and the bearing and coupled thereto; and
    a sealing member configured to seal between the housing and the shaft.

6. The idle gear set for an overhead poultry conveyor of claim 5, wherein the sealing member includes a sealing lip, configured to contact the housing and seal between the housing and the shaft, at a circumference thereof.

7. The idle gear set for an overhead poultry conveyor of claim 6, wherein the housing includes a penetration hole, through which the shaft passes, at a center thereof, and a contacting part including an inclined surface protrudes from a circumference of the penetration hole, and the sealing lip inclines further than the inclined surface and closely contacts the contacting part.

8. The idle gear set for an overhead poultry conveyor of claim 7, wherein a bearing pair is spaced apart in an up-down direction, and is fixed through a snap ring installed on an inner circumference of the housing.

* * * * *